Figure 4:
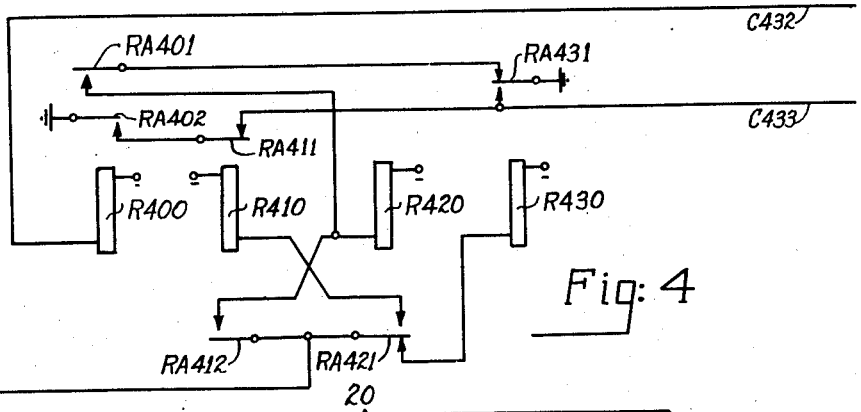

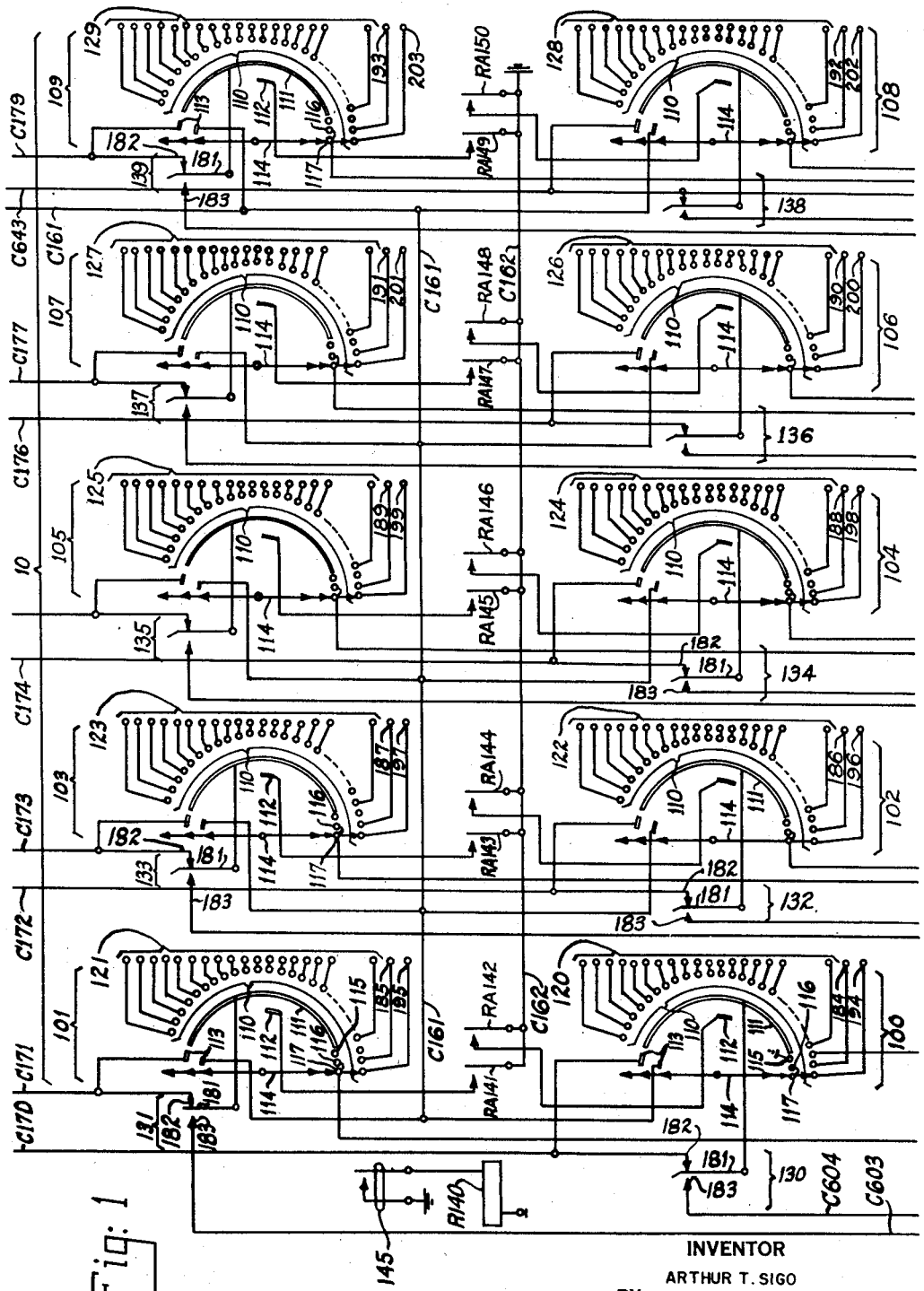

Nov. 10, 1942.　　　　　A. T. SIGO　　　　　2,301,337

TESTING AND INDICATING APPARATUS

Original Filed Dec. 30, 1938　　5 Sheets—Sheet 2

INVENTOR
ARTHUR T. SIGO

Davis, Lindsey, Smith & Shonts
ATTORNEYS

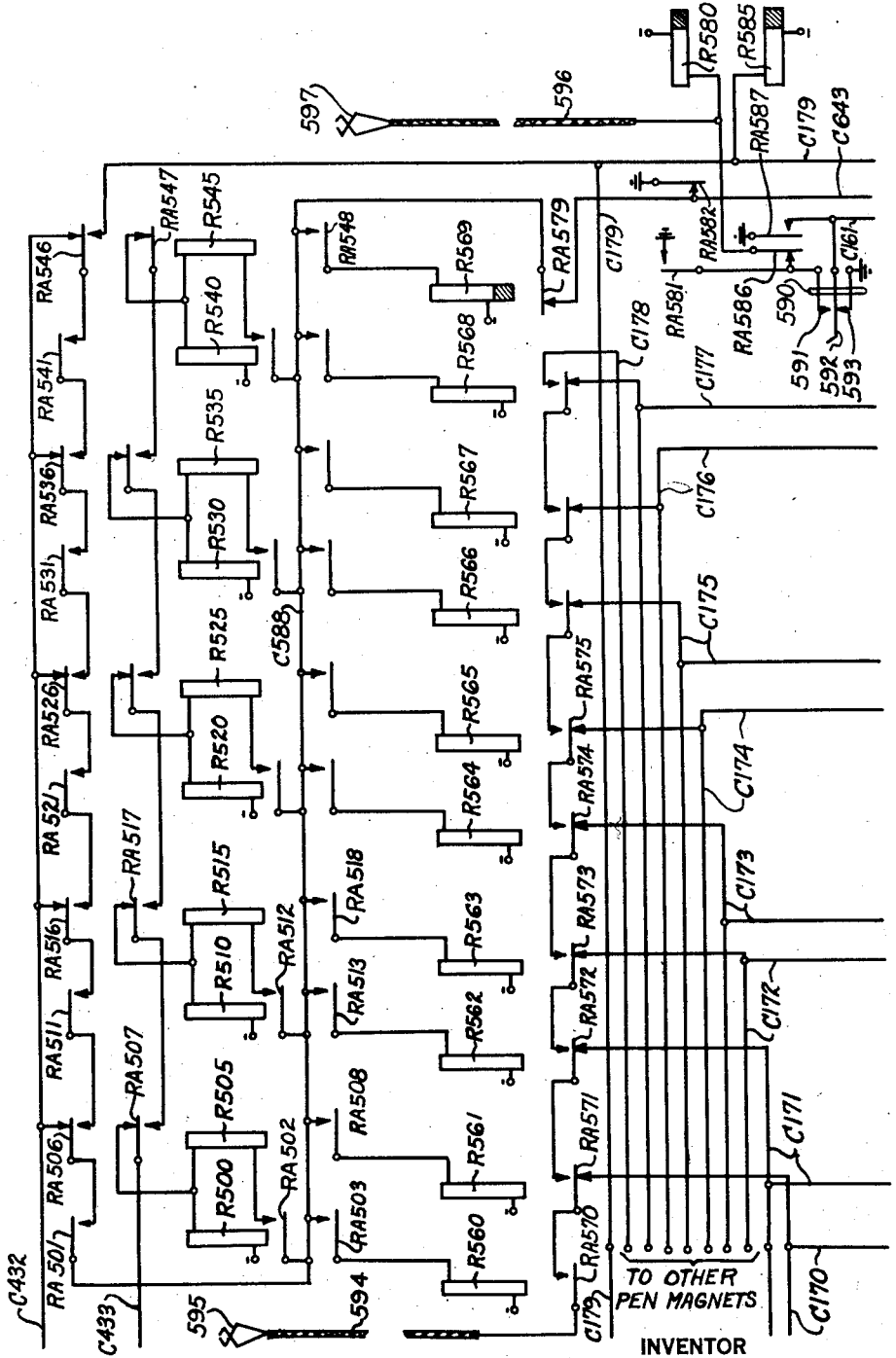

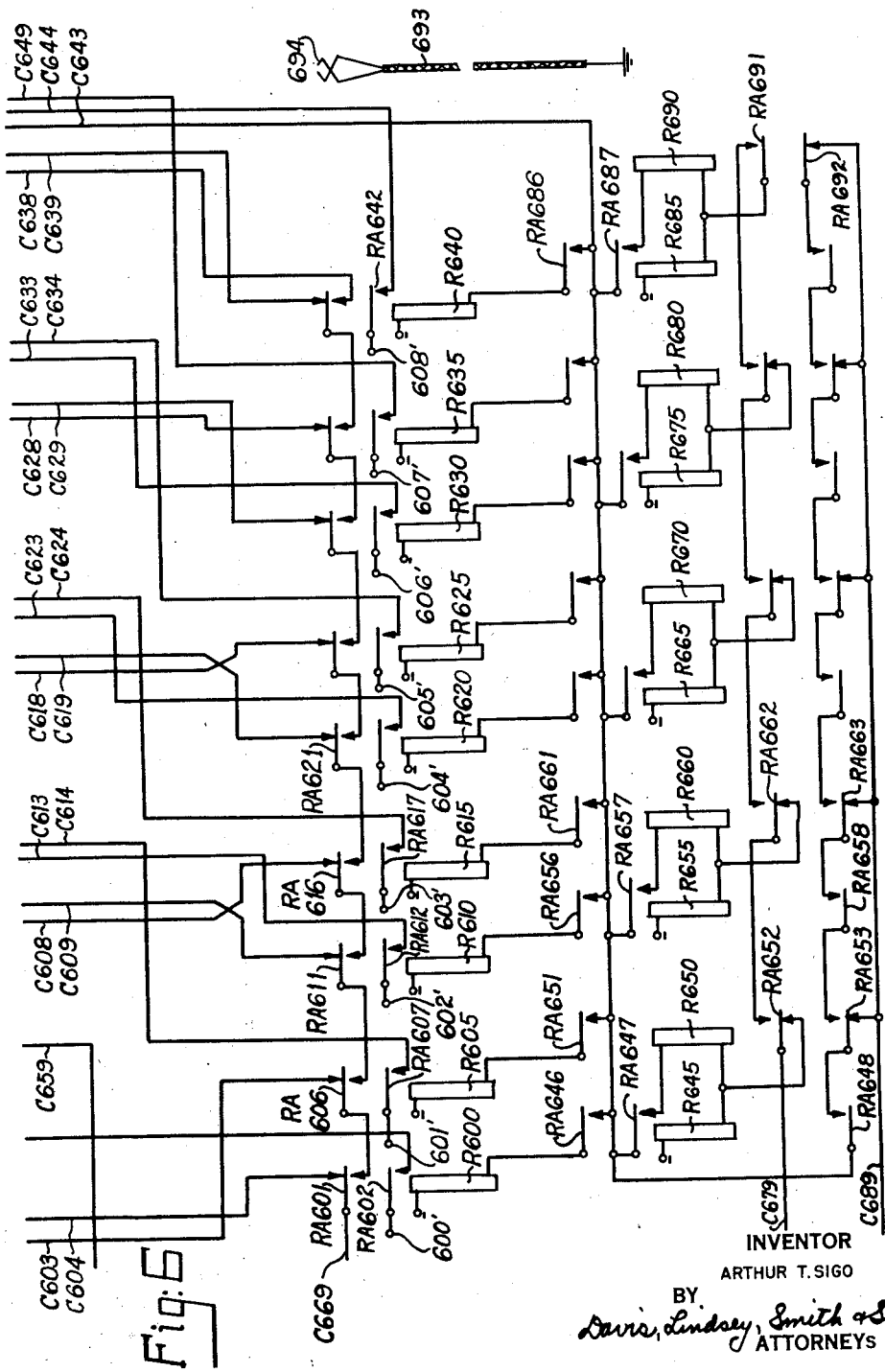

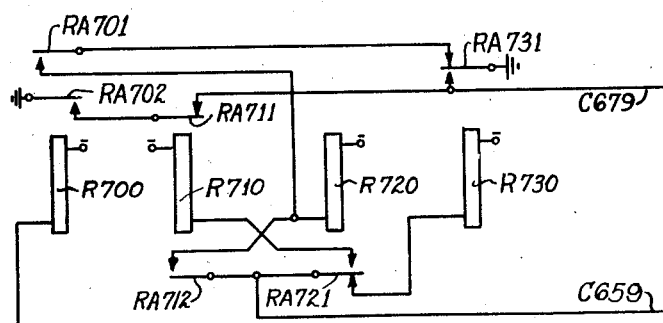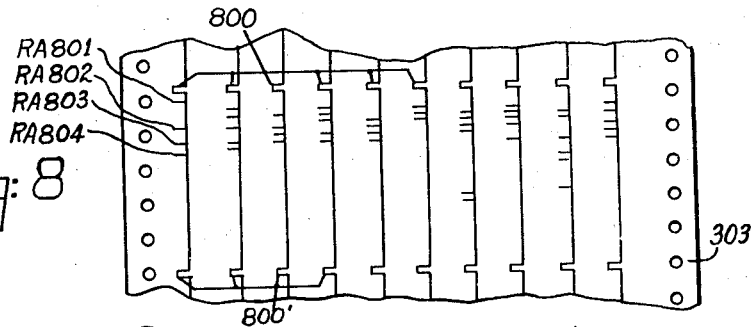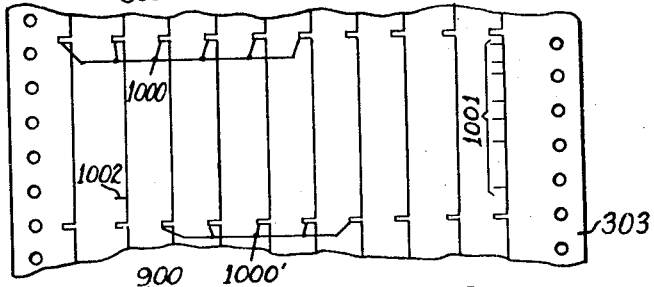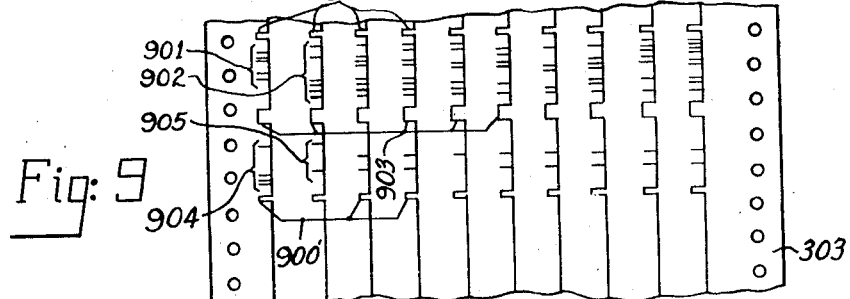

Patented Nov. 10, 1942

2,301,337

UNITED STATES PATENT OFFICE 2,301,337

TESTING AND INDICATING APPARATUS

Arthur T. Sigo, Maywood, Ill., assignor to Associated Electric Laboratories, Inc., Chicago, Ill., a corporation of Delaware Original application December 30, 1938, Serial No. 248,467. Divided and this application November 16, 1940, Serial No. 365,897

15 Claims. (Cl. 234—1.5)

The present invention relates to testing and recording apparatus and, more particularly, to improvements in apparatus for observing load, traffic or other conditions of a plurality of similar devices or pieces of apparatus. The present application is a division of applicant's copending application Serial No. 248,467, filed December 30, 1938.

In many applications involving a plurality of similar machines or devices, it is desirable to make traffic or load studies for the purpose of determining whether an adequate amount of apparatus is available for handling the load or traffic occurring at various intervals and for securing other information concerning the efficiency of the apparatus upon which the observations are made. For example, in telephone practice, it is one of the objects of the traffic department of an operating company to make traffic studies for the purpose of determining such factors as the number of lost calls, the efficiency of trunk groups, the necessity of providing additional link and trunking facilities, etc. Again, in factories and industrial plants, information concerning the operation of a bank of similar machines is useful in determining whether the machines are being used efficiently and whether additional machines could profitably be installed. As a further example, in railroad operations, data concerning the movement of cars or trains and the operation of switches provided in switch yards or at crossings is useful in determining the efficiency of an available track network. Various types of testing and recording apparatus for automatically recording information of the character indicated are commercially available, all of which have in practice, proved to be extremely useful tools in making traffic and efficiency studies on several types of apparatus.

It is an object of the present invention to provide improved and simple apparatus of the character described which is arranged to operate in an exceedingly simple and reliable manner to perform a number of different testing and recording operations.

It is a further object of the invention to provide improved apparatus of the character described which is operative to test the condition of a large number of devices individually and in succession or to make simultaneous tests of different groups of the devices.

It is another object of the invention to provide apparatus of the character described which operates in a cyclic manner repeatedly to perform testing and recording operations and wherein an improved arrangement is provided for indicating the beginning or the end of each testing cycle.

It is still another object of the invention to provide improved apparatus of the character described which is operative to test a plurality of devices group by group and wherein the test registering equipment is automatically transferred in a predetermined manner from group to group of the devices undergoing tests.

It is a still further object of the invention to provide apparatus of the character described which is operative successively to test a plurality of devices arranged in a plurality of groups and wherein an improved and simple arrangement is provided for indicating the beginning of the test of each group of devices.

The invention is illustrated in its embodiment in apparatus for testing a plurality of conductors which may, for example, be individually connected to the release conductors of a plurality of trunk lines embodied in a telephone system. The test conductors are arranged in groups and each thereof is adapted to have a predetermined potential, such, for example, as ground potential, thereon when the associated device is in a predetermined condition. In brief, the recording and testing apparatus comprises a recorder including a plurality of marking elements; a cyclically operating test switch including a plurality of unicontrolled component testing devices individually corresponding to the groups of test conductors and operative simultaneously to test in succession the corresponding conductors of their respective corresponding conductor groups; a register; and a transfer switch. This apparatus may selectively be arranged simultaneously to record the results of simultaneous tests of the several groups of test conductors or to record successively the results of successive tests of the conductors of the different groups. In making a test of the first-mentioned character, each of the marking elements is operatively associated with one of the component testing devices of the test switch and functions to designate, at the end of each test cycle, the total number of conductors of the tested group having the indicated predetermined potential thereon. For the purpose of recording the beginning of each test cycle, means are provided for causing the operation of all of the marking elements at the beginning of each test cycle. The arrangement is such that two groups of devices, such, for example, as two groups of trunks, may be tested during each cycle of operation of the test switch. In such case and in order to separate the recorded results of the tests of the two line groups, provisions are made for causing the operation of all of the marking elements at the intermediate point in each cycle of operation of the test switch following the completed test of one group of test conductors and preceding the testing of the conductors of the second group. In performing tests of the character just described, the transfer switch and the register are not utilized.

The transfer switch and the register are operatively associated with the recorder and test switch when it is desired to record successively the results of successive tests of the different test conductor groups. More particularly, the transfer switch is operative under the control of the test switch to associate the register successively with different ones of the testing devices embodied in the test switch, and each of the testing devices, when operatively associated with the register, is operative to cause the operation of the register each time a test conductor having the indicated predetermined potential thereon is tested. Apparatus controlled by the register and operative in response to a predetermined operation of the register is provided for causing the operation of a predetermined one of the marking elements each time a predetermined number of the test conductors having the indicated predetermined potential thereon are tested. This apparatus also functions to initiate a new cycle of operation of the register. The transfer switch is cyclically operative in that it repeatedly associates the testing devices of the test switch with the register and, in order to adjust each complete test cycle to include any desired number of devices or conductors to be tested, means are also provided for changing the operating cycle of the transfer switch operatively to associate any desired number of the testing devices with the register during each complete test cycle.

Further features of the invention pertain to the particular arrangement of the elements whereby the above and additional operating features are attained.

Figure 2:
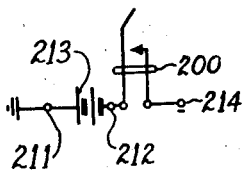

The novel features believed to be characteristic of the invention are set forth with particularity in the appended claims. The invention, both as to its orgnization and method of operation, together with further objects and advantages thereof, will best be understood by reference to the specification taken in connection with the accompanying drawings, in which Figure 1 illustrates the wiring arrangement of the test switch and the test conductors extending thereto, together with certain of the control apparatus therefor, Fig. 2 illustrates the master switch through which current is supplied to certain of the relays embodied in the apparatus, Fig. 3 illustrates in schematic form one type of recorder which may be used in the apparatus, Figs. 4 and 5, taken together, illustrate the register, Figs. 6 and 7, considered together, illustrate the transfer switch, and Figs. 8, 9 and 10 illustrate segments of records produced during the different testing and recording operations of which the apparatus is capable.

Referring now more particularly to the drawings, the apparatus is illustrated as comprising a test switch 10 which is of the well-known rotary type and comprises a plurality of uncontrolled component testing devices or panels 100 to 109, inclusive, having extending thereto corresponding groups of test conductors 120 to 129, inclusive. Each of the testing devices comprises a set of contacts 110 of twenty-eight points each, the first twenty-five contacts in each set being utilized to terminate the twenty-five test conductors of the corresponding test conductor group. Each testing device or panel further includes a continuous conducting segment 111 disposed opposite the first twenty-five contacts of the associated contact set 110 and a double-ended wiper set 114 including wipers for connecting successively the first twenty-five contacts of the associated contact set 110 to the associated conducting segment 111. For control purposes to be described in detail hereinafter, there are also provided in each testing device a pair of additional contact segments 113 arranged to be bridged by wipers embodied in the associated wiper set 114, a connecting segment 112 adapted to be connected to the associated segment 111 through wipers carried by the associated wiper set 114, and three contacts 115, 116 and 117 arranged respectively to be connected to the twenty-sixth, twenty-seventh and twenty-eighth contacts of the associated contact set 110 through the wipers of the associated wiper set 114. As indicated above, the wipers 114 are unicontrolled in that they are all mounted on the same drive shaft in the same radial positions. These wipers are arranged to be driven over their associated contacts through operation of a synchronous motor, not shown, which is arranged to drive the wiper shaft through a suitable speed reducing mechanism. The arrangement of the contacts in the contact set 110 of each testing device and of the associated conducting segments is such that, during operation of the test switch 10, the wipers of each wiper set 114 completely disengage the associated conducting segments 113 before being moved into engagement with the associated segment 111 and the contacts of the associated contact set 110. Further, during operation of each testing device, each contact of the contact set 110 included therein is completely disengaged by the wiper of the associated wiper set 114 before this wiper is moved into engagement with the next succeeding contact of the contact set 110.

Figure 3:
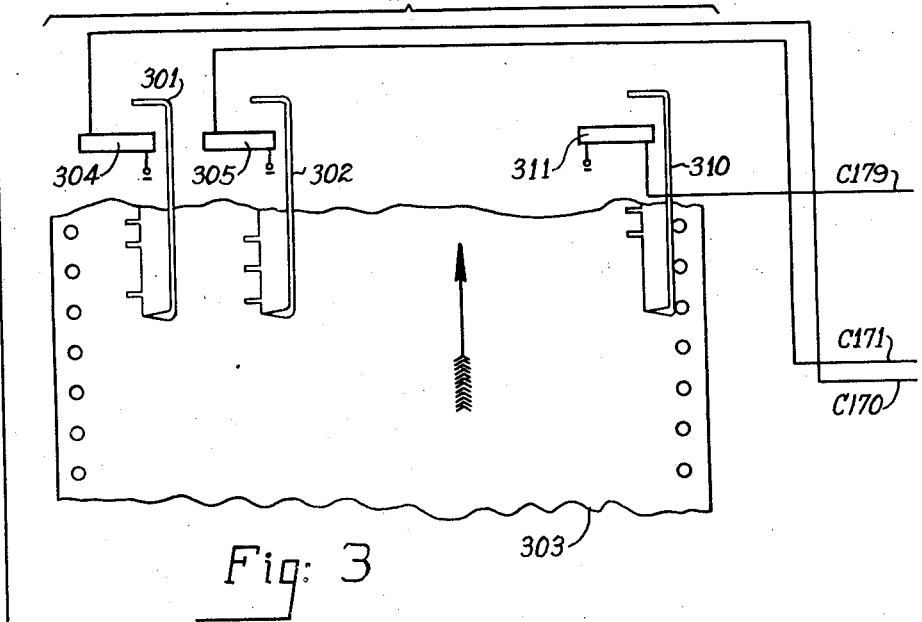

The apparatus further comprises a recorder, diagrammatically illustrated at 20 in Fig. 3, which is of the multi-pen type and, preferably, is of the improved construction disclosed and claimed in Patent No. 2,132,808—Sigo, granted October 11, 1938. In brief, the recorder 20 comprises a plurality of marking elements, three of which are indicated at 301, 302 and 310, respectively, each including a stylographic pen normally engaging a paper record strip 303 which is adapted to be unwound from a winding spool and moved over a driving cylinder at either of two or more different and uniform rates. Each marking element further includes an operating magnet, those embodied in the elements 301, 302 and 310 being indicated at 304, 305 and 311, respectively, which is adapted, when energized, to operate the associated pen to an off-normal position so that an off-trace line is inscribed on the record strip. In the arrangement illustrated, a recorder 20 comprising ten marking elements is required fully to utiilze the line testing capacity of the test switch 10. For the purpose of causing the operation of all of the marking elements embodied in the recorder 20 at a point intermediate in each cycle of operation of the test switch 10, there is provided in the control apparatus for this switch a relay R140 under the control of a manually operable switch 145. This relay, in cooperation with the contact segments 111 and 112 and the wiper sets 114 of the respective testing devices, functions to complete circuits for respectively energizing the operating magnets of all of the marking elements during a predetermined portion of the movement of the respective wiper sets 114. The conducting segments 113, in cooperation with their respective associated wiper sets 114, are also arranged simultaneously and momentarily to complete the operating circuits for the operating magnets of the respective marking elements at the beginning of each cycle of operation of the test switch 10.

With the apparatus thus far described, it is possible simultaneously to test and record the condition of the lines or devices of ten groups of twenty-five lines or devices during each cycle of operation of the test switch 10. Alternatively, with this apparatus, twenty groups of lines, each including ten lines or less, may be tested during each cycle of operation of the switch 10 and the results of the tests recorded through operation of the recorder 20. In order to adapt the apparatus for use in testing and recording the condition of a single large group of two hundred and fifty or less lines, the register shown in Figs. 4 and 5 and the transfer switch shown in Figs. 6 and 7 are provided. For the purpose of operatively associating the register and the transfer switch with the test switch 10 and of disassociating the marking elements of the recorder 20 from the various testing devices of the test switch 10, there are provided ten manually operable key switches indicated at 130 to 139, inclusive. Briefly described, the register shown in Figs. 4 and 5 comprises ten current pulse counting relays R500, R505, R510, R515, R520, R525, R530, R535, R540 and R545; ten control relays R560 to R569, inclusive, individually responsive to operation of the corresponding counting relays; and a control relay network comprising four relays R400, R410, R420 and R430 which are operative to cause the sequential operation of the enumerated pulse counting relays in response to succeeding current pulses transmitted thereto from the switch 10. The control relays R560 to R568, inclusive, are individually operative to prepare the operative circuits for the operating magnets of corresponding ones of the marking elements embodied in the recorder 20. The tenth control relay R569, which is of the slow-to-release type, is operative to cause the operation of the operating magnet 311 of the tenth marking element 310 and also to condition all of the counting and control relays to start a new cycle of operation. By this arrangement, each time ten current pulses are delivered to the control relay network illustrated in Fig. 4, the relay R569 is caused to operate to cause the operation of the marking element 310, thus indicating that ten conductors having the above-mentioned predetermined potential thereon have been tested by the test switch 10. Also, upon operating, the relay R569 causes the release of all of the counting and control relays of the register so that a new current pulse counting operation is started.

The transfer switch mentioned above and illustrated in Figs. 6 and 7 comprises a plurality of current pulse counting relays R645, R650, R655, R660, R665, R670, R675, R680, R685 and R690; a plurality of control relays R600, R605, R610, R615, R620, R625, R630, R635 and R640; and a control relay network comprising four relays R700, R710, R720 and R730, which operate in response to successive current pulses transmitted thereto from the test switch 10 to cause the sequential operation of the enumerated pulse counting relays R645, R650, R655, etc. Each of the nine control relays R600, R605, R610, etc., is operative in response to operation of the corresponding counting relay to associate the register with a different one of the testing devices or panels embodied in the test switch 10. Thus, a complete test cycle on the part of the switch 10 comprises five revolutions of the shaft carrying the wiper sets 114 and the operation of all nine of the control relays embodied in the transfer switch shown in Figs. 6 and 7. For the purpose of initiating a new test cycle following a complete testing operation of the character described, there are provided two slow-to-release relays R580 and R585, which may be connected to be jointly controlled by the transfer switch and the test switch 10 through operation of a manually operable key switch 590. These two relays function to release all of the counting and control relays embodied in the transfer switch at the end of each complete testing operation performed by the test switch 10.

The operating circuits for the relays R580 and R585 and the various relays embodied in the register and the transfer switch commonly include a pair of terminals 211 and 212 to which the terminals of a source of direct current as, for example, the battery 213 are adapted to be connected. For the purpose of controlling this common portion of the indicated operating circuits there is provided a master switch 200. In an assembled unit the grounded terminal 211 is connected to each of the illustrated conductors indicated as being connected to ground; the negative battery terminal 212 is connected to the negative terminal of each of the marking pen operating magnets; and the terminal 214 is connected to the illustrated negative terminals of the above-mentioned relays. For convenience in describing the circuits, however, the connecting bus conductors have not been illustrated.

As pointed out above, when the register and transfer switch are operatively associated with the test switch 10, each complete test cycle may be changed to include the testing operations performed by any desired number of the testing devices embodied in the test switch 10. To this end, the circuits through which current pulses are delivered to the operating magnets of the marking elements embodied in the recorder 20 commonly include a conductor 594 terminating in a clip 595 which is adapted to be connected to any one of the terminals 184 to 193, inclusive, respectively embodied in the testing devices 100 to 109, inclusive. Further to this end, there is provided a second cable 596 which terminates in a clip 597. This clip is adapted to be connected to any one of the terminals 194 to 203, inclusive, which are respectively associated with the testing devices or test panels 100 to 109, inclusive. For this same purpose, there is also provided a third cable 693 terminating in a clip 694 which is adapted to be connected to any one of the terminals 600' to 608', inclusive.

In constructing the testing and registering apparatus, described above, the various elements thereof are preferably assembled as a unit which, due to the simplicity of the apparatus, may be made of small size for easy portability. As assembled, the unit preferably includes a terminal and switch panel including terminals to which the test conductors of the groups 120 to 129, inclusive, individually extend. This panel may also have mounted thereon the various key switches, mentioned above, the master switch 200, the terminals 211, and the respective terminals 184 to 193, inclusive, 194 to 203, inclusive, and 600' to 609', inclusive, to which the cable clips 595, 597 and 694 are adapted selectively to be connected. Also, the marking element circuit conductors C170 to C179, inclusive, are connected to terminals mounted on the terminal panel through which connections may easily be made to the terminal block of the recorder.

*Testing and recording simultaneously the condition of the lines of ten groups of lines*

Referring now more particularly to the operation of the apparatus, and assuming, for example, that it is desired to test and record the idle or busy condition of the trunk lines of ten groups, each including twenty-five lines, the release conductors of the trunk lines are connected to the test conductors extending to the testing devices 100 to 109, inclusive. More particularly, the release conductors of the trunk lines of the first group are individually connected to the test conductors in the group 120, the release conductors of the trunk lines in the second group are individually connected to the conductors of the test conductor group 121, and so on. As is well known in telephone practice, the character of the potential present on the release conductor of a trunk line determines whether the line is idle or busy. In the usual arrangement, when a trunk line becomes busy, ground potential is impressed upon the release conductor thereof, whereas, so long as a line remains idle, the negative potential of the exchange battery is maintained upon its release conductor. In a testing and recording operation of the character just mentioned, the key switches 130 to 139, inclusive, 145, 200 and 500 are left in their respective normal positions, as shown in the drawings. Also, the marking element circuit conductors C170 to C179, inclusive, are connected to the operating magnets of the recorder 20 in the manner illustrated. With the circuits arranged in this manner and when the motors for respectively driving the recorder 20 and the test switch 10 are energized, the recording tape 303 is moved across the pens of the various marking elements and the wiper sets 114 are driven over their respective associated contacts. When the wipers of the sets 114 bridge their respective associated conducting segments 113, circuits are completed for energizing the respective operating magnets of the ten marking elements embodied in the recorder 20. Thus, when the conducting segments 113 of the testing device 100 are bridged by the wipers of the associated wiper set 114, a circuit is completed for energizing the operating magnet 304 of the marking element 301, this circuit extending from ground at the switch spring 593 by way of the spring 592, C161, the segments 113 of the testing device 100 as bridged by the wipers of the associated wiper set 114, C170, and the winding of the magnet 304 to battery. When energized over this circuit, the magnet 304 attracts its associated armature to move the pen of the marking element 301 off normal so that an off-trace line is inscribed upon the record strip 303. Similarly, when the conducting segments 113 of the testing device 101 are bridged by the wipers of the associated wiper set 114, a circuit is completed for energizing the operating magnet 305 of the second marking element 302, this circuit extending by way of the grounded conductor C161, the conducting segments 113 of the testing device 101 as bridged by the associated wipers 114, C171, and the winding of the magnet 305 to battery. The resulting operation of the magnet 305 causes the pen of the marking element 302 to inscribe an off-trace line upon the record strip 303. Again, when the segments 113 of the tenth testing device 109 are bridged by the wipers of the associated wiper set 114, a circuit is completed for energizing the operating magnet 311 of the tenth marking element 310. This circuit extends by way of the grounded conductor C161, the segments 113 of the testing device 109 as bridged by the wipers of the associated wiper set 114, C179 and the winding of the magnet 311 to battery. The resulting operation of this magnet causes the pen of the marking element 310 to be moved off normal to inscribe an off-trace line on the record strip 303. In a similar manner, each of the other seven marking elements is caused to operate to inscribe an off-trace line on the record strip 303. Since the conducting segments 113 are relatively wide, the operating magnets 304, 305, 311, etc., of the ten marking elements are maintained energized for a substantial time interval so that relatively wide off-trace markings are inscribed on the record strip 303 during the interval when the wipers of the wiper sets 114 are traversing their respective associated contact segments 113. The coincidence and width of these markings indicate the start of a test cycle. Obviously, when the wipers of the wiper sets 114 are respectively disengaged from their associated conducting segments 113, the above-traced circuits for energizing the operating magnets 304, 305 and 311 and the other similar operating circuits for the operating magnets of the other marking elements are all interrupted, with the result that the recording pens are returned to their normal positions. During continued movement of the wipers, each of the marking pens is operated to its off-normal position each time the wipers of the corresponding testing device are operated into engagement with a contact terminating the release conductor of a busy trunk line. For example, if the first trunk line of the first group is busy, ground potential is impressed upon the No. 1 contact of the contact set 110 embodied in the testing device 100 over the first test conductor of the group 120. When, therefore, the wipers of the wiper set 114 embodied in the testing device 100 connect the No. 1 contact of the associated contact set 110 to the associated contact segment 111, a circuit is completed for energizing the operating magnet 304 of the first marking element 301. This circuit may be traced as extending by way of the grounded first contact of the contact set 110 embodied in the testing device 100, the wipers of the associated wiper set 114, the associated contact segment 111, the contacts 181 and 182 of the switch 130, C170 and the winding of the magnet 304 to battery. The resulting operation of the magnet 304 causes the pen of the marking element 301 momentarily to be moved to the off-normal position to inscribe an off-trace line upon the record strip 303. The interval during which the magnet 304 is energized over the circuit just traced is quite short since the bridge formed by the wipers of the wiper set 114 between the contact segment 111 and the first contact of the set 120 in the testing device 100 is interrupted shortly following its completion in response to the continued rotation of the wipers 114. In a manner similar to that just described, the marking element 301 is energized each time another of the trunk lines in the group having release conductors connected to the test conductors of the group 120 is found to be in a busy condition. For example, if the fourth, sixth and eighth trunk lines of the indicated group are busy during the test cycle under consideration, ground potential is impressed upon the conducting segment 111 of the testing device 100 to cause the operation of the marking element 301 when the wipers of the associated wiper set 114 engage the fourth, sixth and eighth contacts of the contact set 110 embodied in this testing device.

During movement of the wipers 114, each of the other testing devices 101 to 109, inclusive, is also operative to deliver a current pulse to the operating magnet of the associated marking element each time a tested trunk line is found to be in a busy condition. For example, if the second, third, fourth, fifth and sixth trunk lines of the group having release conductors connected to the test conductors of the group 121 are busy at the time of the test cycle under consideration, ground potential is impressed upon the contact segment 111 of the testing device 101 when the wipers of this device engage the second, third, fourth, fifth and sixth contacts of the associated contact set 110. Each time ground potential is impressed upon the indicated contact segment 111, the operating magnet 305 of the second marking element 302 is energized over a circuit extending by way of the grounded segment 111 of the device 101, the springs 181 and 182 of the switch 131, C171 and the winding of the magnet 305 to battery. As a result, the pen of the marking element 302 is operated to inscribe an off-trace line upon the record strip 303 during movement of the wipers of the set 114 embodied in the testing device 101 to engage the second, third, fourth, fifth and sixth contacts of the associated contact set 110. Again, if the second, third, fourth, fifth, sixth and seventh trunk lines of the tenth trunk group having release conductors connected to the test conductors of the group 129 are busy during the interval of the test cycle under consideration, the operating magnet 311 of the tenth marking element 310 is energized during movement of the wipers embodied in the testing device 109 to engage the respective second, third, fourth, fifth, sixth and seventh contacts of the associated contact set 110. In this case, the circuit for energizing the magnet 311 extends by way of the grounded contact segment 111 embodied in the testing device 109, the springs 181 and 182 of the switch 139, C179 and the winding of the magnet 311 to battery. Each time this magnet is energized, it attracts its associated armature to cause the pen of the marking element 310 to inscribe an off-trace line upon the record strip 303. The above testing and recording operations continue during movement of the wipers of the various testing devices over the first twenty-five contacts of their respective associated contact sets 110. At the end of the test cycle and during movement of the indicated wipers over the twenty-sixth, twenty-seventh and twenty-eighth contacts of their respective associated contact sets 110, the operating magnets of the marking elements embodied in the recorder 20 are not energized, thus providing a spacing interval between the completed test cycle and the next succeeding test cycle. At the beginning of the next test cycle, the wipers of the various testing devices again bridge their respective associated contact segments 113 to again energize the operating magnets of all of the marking elements, whereby coincident and relatively wide off-trace lines are inscribed upon the record strip 303 to designate the beginning of the new test cycle.

The form of record obtained during a complete test cycle of the character just described is illustrated in Fig. 8 wherein a segment of the record strip 303 is shown. As described above, at the beginning of the test cycle, all of the marking elements were operated for a short time interval so that coincident off-trace markings, indicated at 800, were inscribed upon the record strip. Following these coincident markings, four off-trace lines 801, 802, 803 and 804 were inscribed upon the record strip 303 by the first marking element 301. These four lines indicate that four trunk lines in the first group of trunk lines were found to be busy during the test cycle. Moreover, the spacing between the enumerated markings indicates that the first, fourth, sixth and eighth trunk lines were the busy lines of the first group. In a similar manner, the five off-trace lines inscribed by the second marking element 302 on the record strip 303 indicate that five trunk lines of the second group were found to be busy during the test cycle and the spacing between the off-trace markings indicates that the second, third, fourth, sixth and seventh lines were the busy lines of the second group. In view of this explanation, the significance of the remaining off-trace lines shown in Fig. 8 and inscribed by the other marking elements of the recorder 20 upon the record strip 303 will be readily apparent. Following the completion of the test cycle and just preceding the next succeeding cycle, when the operating magnets of the marking elements were again energized, coincident off-trace markings 800' were inscribed upon the record strip to indicate the start of the new test cycle.

*Testing and recording the condition of lines divided into twenty groups of ten lines or less each*

When it is desired simultaneously to test and record the condition of a plurality of trunk lines divided into a large number of small groups of ten or more lines each, the release conductors of the lines in each of two groups are connected to the test conductors extending to each testing device. For example, the release conductors of the first two groups of lines to be tested may be connected to the test conductors of the conductor set 120 extending to the testing device 100, the release conductors of the lines in the third and fourth groups may be connected to the test conductors of the group 121, and so on. In the event the groups contain a like number of ten lines each, the test conductors respectively extending to the first to tenth contacts and the sixteenth to twenty-fifth contacts of the contact sets 110 respectively embodied in the testing devices are utilized as the active test contacts, the test conductors extending to the eleventh to fifteenth contacts of each of the contact sets 110 being left open-circuited. In order to cause the recorder 20 to record markings separating the records made with respect to the two groups of lines tested by each testing device during each cycle of operation of the test switch 10, the key switch 145 is operated to its off-normal position to complete an obvious circuit for energizing the relay R140. This relay, upon operating, completes, at its armatures RA141 to RA150, inclusive, parts for impressing ground potential upon the contact segments 112 of the respective testing contacts 100 to 109, inclusive. These paths commonly extend by way of the grounded conductor C162 and branch through the respective enumerated armatures of the relay R140 to the respective contact segments 112 of the ten testing devices. In performing testing and recording operations of this character the key switches 130 to 139, inclusive, 200 and 500 are left in their respective normal positions, and the marking element conductors C170 to C179, inclusive, are connected to the pen operating magnets of the recorder 20 in the manner illustrated. With the connections arranged in this manner and during operation of the apparatus, the testing and recording operations performed on the individual lines are carried out in the exact manner described in the preceding section. Also, at the beginning of each cycle of operation of the test switch 10, when the wipers of each of the wiper sets 114 bridge their associated conducting segments 113, all of the marking elements embodied in the recorder 20 are caused to operate to inscribe coincident off-trace lines upon the record strip 303, thereby to indicate the beginning of the test cycle. The testing of the respective first groups of lines associated with the various testing devices is completed when the wipers of the testing devices are moved to disengage the tenth contacts of their respective associated contact sets 110, while the testing of the second groups of lines respectively associated with the testing devices is started when the indicated wipers are moved into engagement with the sixteenth contacts of their respective associated contact sets 110. During the intervening movement and when the wipers bridge their respective associated contact segments 111 and 112, circuits are completed for energizing the operating magnets of all of the marking elements embodied in the recorder 20. For example, the magnet 304 of the first marking element 301 is energized over a circuit extending by way of the grounded conductor C162, RA142, the contact segments 112 and 111 of the testing device 100 as bridged by the wipers of the associated wiper set 114, the switch springs 181 and 182 of the switch 130, C170 and the winding of the magnet 304 to battery. The corresponding circuit for the operating magnet 305 of the second marking element 302 extends by way of the grounded conductor C162, RA141, the contact segments 112 and 111 of the testing device 101 as bridged by the wipers of the associated wiper set 114, the switch springs 181 and 182 of the switch 131, C171 and the winding of the magnet 305 to battery. Again, the corresponding operating circuit for the magnet 311 of the tenth marking element 310 may be traced as extending by way of the grounded marking conductor C162, RA149, the bridged contact segments 112 and 111 of the testing device 109 as bridged by the wipers of the associated wiper set 114, the springs 181 and 182 of the switch 139, C179 and the winding of the magnet 311 to battery. Similar and obvious circuits are completed for energizing the operating magnets of the other seven marking elements. The resulting simultaneous operation of the ten marking elements causes coincident off-trace lines to be inscribed upon the record strip 303. It will be noted that the length of each of the segments 112 is considerably greater than the length of each of the segments 113 and, hence, the period during which the operating magnets of the marking elements are maintained energized over the circuits just traced is considerably greater than the period during which the marking elements are simultaneously operated at the beginning of each cycle of operation of the test switch 10. As a result, longer coincident off-trace lines are inscribed upon the record strip 303 during movement of the switch wipers to traverse their respective associated contact segments 112.

The character of a typical record inscribed upon a segment of the record strip 303 during a complete cycle of operation of the test switch 10, when the apparatus is arranged in the manner just described, is illustrated in Fig. 9. In this figure, the coincident off-trace markings 900 and 900′ designate the starting points for two different cycles of operation of the test switch 10. The off-trace lines indicated at 901 and inscribed upon the record strip by the first marking element 301 designate busy trunk lines tested by the first testing device 100 during the operation of this device to test the ten lines of the first group associated therewith. The spacing between the individual marks inscribed upon the record strip by this first pen indicate that the first, second, third, fifth and sixth trunk lines of the indicated group were in a busy condition when tested. In a similar manner, the off-trace lines indicated at 902 and inscribed by the second marking element 302 of the recorder 20 show that six lines of the first group tested by the testing device 101 were in a busy condition when tested, and the spacing of these lines indicates that the busy lines were the first, third, seventh, eighth, ninth and tenth lines of the group. The relatively long coincident off-trace lines indicated at 903, inscribed upon the record strip through operation of the marking elements during the interval separating the operations of the respective testing devices to test their respective associated first groups of lines and their respective associated second groups of lines, indicate the completion of the tests of the respective first groups of lines individually associated with the various testing devices. The off-trace lines indicated at 904 and 905 respectively designate busy trunk lines of the second groups respectively tested by the two testing devices 100 and 101. The four marks indicated at 904 and inscribed upon the record strip by the first marking element 301 show that four trunk lines of the second group tested by the testing device 100 were busy at the time of the test and the spacing of these lines identifies the third, eighth, ninth and tenth lines of the tested group as the busy lines. Similarly, the two off-trace lines indicated at 905 and inscribed upon the record strip by the second marking element 302 indicate that two of the lines of the second group tested by the testing device 101 were busy at the time of the test and the spacing of these lines identifies the third and eighth lines of the tested group as the busy lines. In view of the foregoing explanation, the significance of the remaining off-trace lines inscribed upon the segment of the record strip shown in Fig. 9 is believed to be obvious.

*Testing in succession the lines of one large group and recording the condition thereof*

When it is desired to test in succession and record the condition of the lines forming a single large group, the release conductors of the lines are connected to the test conductors of the test switch 10 in the manner previouslly explained. If desired, the lines to be tested may be subdivided into ten subgroups, the release conductors of which are connected in groups to the groups of test conductors of the respective testing devices. As explained subsequently, with the release conductor connections arranged in this manner, the apparatus may easily be conditioned to test and record the condition of the lines of the various subgroups simultaneously without altering the release conductor connections. Further, to condition the apparatus to test in succession the lines of a large group of lines and to record the condition thereof, the ten key switches 130 to 139, inclusive, are operated to their respective off-normal positions so that the movable spring 181 of each thereof is disengaged from its associated spring 182 and is moved into engagement with its associated spring 183. Assuming that from two hundred and twenty-six to two hundred and fifty lines are included in the group upon which the observation is to be made, the clip 694 terminating the conductor 693 is connected to the terminal 608'; the clip 597 terminating the conductor 596 is connected to the terminal 203; and the clip 595 terminating the conductor 594 is connected to the terminal 193. Also, the switch 590 is moved to its off-normal position and the switch 200 is operated to close its contacts in order to prepare the respective operating circuits for the relays embodied in the transfer switch shown in Figs. 6 and 7 and the register illustrated in Figs. 4 and 5. The switch 145 is maintained in its normal position so that the relay R140 is in its restored position throughout the test. Finally, the marking element conductors C170 to C179, inclusive, are connected to the pen operating magnets of the recorder 20 in the manner illustrated, and the speed of the record strip 303 is reduced to a low value by changing the gear ratio between the driving motor of the recorder and the driving roller for the record strip.

With the apparatus arranged in the manner just described, the transfer switch shown in Figs. 6 and 7 operates successively to associate the register shown in Figs. 4 and 5 with different ones of the testing devices 100 to 109, inclusive, in response to current pulses transmitted thereto through operation of the first testing device 100 at the end of each cycle of operation of the test switch 10. Each of the testing devices, when operatively associated with the register shown in Figs. 4 and 5, operates to transmit a current pulse to the register each time a test conductor having ground potental thereon is encountered by the wipers thereof. More particularly, during the first cycle of operation of the test switch 10, ground potential is impressed upon the pulsing conductor C669 each time the wipers of the testing device 100 encounter a contact of the associated set 110 having ground potential thereon. The path over which ground is connected to the pulsing conductor C669 may be traced as extending from the grounded contact of the contact set 110 embodied in the testing device 100 by way of the wipers of the associated wiper set 114, the associated contact segment 111, the springs 181 and 183 of the switch 130, C604 and RA601 to the conductor C669. The first time ground potential is impressed upon the indicated pulsing conductor, the relay R430 is energized over a circuit extending by way of this conductor, RA421 and the winding of R430 to battery. When energized over this circuit, the relay R430 operates to complete, at RA431 and its associated working contact, a circuit extending by way of C433 and RA507 for energizing the first counting relay R500. Upon operating, the relay R500 completes, at RA502, a path for short-circuiting the winding of the second counting relay R505, this path extending from ground at RA431 by way of C433, RA507, the winding of R505, RA502, C588, and RA579 back to ground at RA582. At RA503, the relay R500 completes a circuit for energizing the first control relay R560, this circuit extending by way of the grounded register release conductor C588, RA503 and the winding of R560 to battery. The control relay R560, upon operating, prepares, at RA570, a circuit for energizing the operating magnet 304 of the first marking element 301 embodied in the recorder 20.

At RA501, the counting relay R500, upon operating, completes a circuit for energizing the relay R400, this circuit extending by way of the grounded release conductor C588, RA561, RA506, C432 and the winding of R400 to battery. The relay R400 now operates to complete, at RA402, a circuit extending by way of RA411, C433 and RA507 for maintaining the first counting relay R500 operated after the current pulse transmitted to the relay R430 in the manner described above is ended. At RA401, the relay R400 prepares a circuit for energizing the relay R420. When the wipers of the testing device 100 are disengaged from the contact of the associated contact set 110 having ground potential thereon, the current pulse transmitted to the relay R430 by way of the pulsing conductor C669 is terminated, causing this relay to restore and complete, at RA431, the prepared operating circuit for the relay R420. This circuit extends from ground by way of RA431, RA401 and the winding of R420 to battery. The relay R420, upon operating, opens, at RA421 and its associated resting contact, a point in the previously traced operating circuit for the relay R430 and prepares, at RA421 and its associated working contact, a circuit for energizing the relay R410. Thereafter, and when ground potential is again impressed upon the pulsing conductor C669 through operation of the testing device 100 to test another busy line, a current pulse is transmitted to the relay R410, the circuit traversed by this current pulse extending by way of the grounded conductor C669, RA421 and the winding of R410 to battery. When energized over this circuit, the relay R410 operates to complete a holding circuit for the operated relay R420, this holding circuit extending by way of the grounded conductor C669, RA412 and the winding of R420 to battery. At RA411, the relay R410 opens a point in the previously traced path short-circuiting the winding of the second counting relay R505. When this path is interrupted the respective windings of the two relays R500 and R505 are energized in series over a circuit extending by way of the grounded release conductor C588, RA502, the winding of R505 and the winding of R500 to battery. When energized over this circuit the relay R500 remains operated and the second counting relay R505 operates to complete, at RA503, a circuit extending by way of the grounded release conductor C588 for energizing the second control relay R561. The last-mentioned relay, upon operating, opens, at RA571 and its associated resting contact, the prepared circuit for energizing the operating magnet 304 of the first marking element 301. At RA571 and its associated working contact, the second control relay R561 prepares a circuit for energizing the operating magnet 305 of the second marking element 302.

The second counting relay R505, upon operating, also opens, at RA507 and its associated resting contact, a point in the previously traced circuit for energizing the first counting relay R500. At this same armature and its associated working contact, the relay R505 prepares a circuit for energizing the third counting relay R510. At RA506 and its associated resting contact, the relay R505 opens a point in the previously traced circuit for energizing the relay R400, causing the last-mentioned relay to restore. At RA506 and its associated working contact, the relay R505 prepares a second circuit for energizing the indicated control relay R400. The relay R400, upon restoring, opens, at RA401, a point in the operating circuit for the relay R420 and, at RA402, a further point in the above-traced operating circuit for the first counting relay R500.

When ground potential is removed from the pulsing conductor C669 through continued operation of the testing device 100, thereby to terminate the current pulse transmitted to the relay R410, this relay and the relay R420 restore. The relay R410, upon restoring, reprepares, at RA411, a point in the common portion of the operating circuits for the odd numbered counting relays and opens, at RA412, a point in the previously traced holding circuit for the relay R420. The relay R420, upon restoring, opens, at RA421 and its associated working contact, a further point in the operating circuit for the relay R410 and reprepares, at RA421 and its associated resting contact, the previously traced operating circuit for the relay R430.

The control network of the register, as illustrated in Fig. 4, responds to succeeding current pulses transmitted thereto to cause the sequential operation of succeeding ones of the counting relays shown in Fig. 5, in a manner similar to that just described. Thus, the relay R430, upon operating at the beginning of the third current pulse transmitted by way of the pulsing conductor C669, completes, at RA431, the prepared operating circuit for the third counting relay R510, this circuit extending by way of C433, RA507 and its associated working contact, RA517 and its associated resting contact and the winding of the relay R510 to battery. Upon operating, the relay R510 recompletes the operating circuit for the relay R400, completes a path for short-circuiting the winding of the fourth counting relay R415 and completes, at RA513, a circuit including the grounded release conductor C588 for energizing the third control relay R562, which latter relay operates to open the prepared operating circuit for the operating magnet 305 of the second marking element 302 and to prepare the operating circuit for the operating magnet of the third marking element, not shown. In this case, the path for short-circuiting the winding of the fourth counting relay R515 extends by way of the grounded release conductor C588, RA512, the winding of R515, RA517, RA507 and C433, back to ground at RA431. The circuit over which the relay R400 is energized the second time extends by way of the grounded release conductor C588, RA501, RA506, RA511, RA516, C432 and the winding of R400 to battery. Upon operating, the relay R400 completes, at RA402, a holding circuit extending by way of RA411, C433, RA507, and RA517 for the third counting relay R510. At RA401, the relay R400 reprepares the operating circuit for the control relay R420, this latter circuit being completed at the end of the third current pulse and in response to the restoration of the relay R430 in the manner previously explained. With the relay R420 operated, the fourth current pulse transmitted from the test switch 10 over the pulsing conductor C669 is utilized to energize the relay R410. This relay, upon operating the second time, opens, at RA411, a point in the previously traced path short-circuiting the winding of the fourth counting relay R515 and completes, at RA412, the above-traced holding circuit for the relay R420. Following the second operation of the relay R410, the respective windings of the third and fourth counting relays R510 and R515 are energized in series over a circuit extending by way of the grounded release conductor C588, RA512, the winding of R515 and the winding of R510 to battery. The relay R510 remains operated, when energized in series with the relay R515 over the circuit just traced, and the relay R515 operates to complete, at RA518, a circuit including the grounded release conductor C588, for energizing the fourth control relay R563. This control relay, upon operating, opens the prepared operating circuit for the operating magnet of the third marking element and prepares a circuit for energizing the operating magnet of the fourth marking element. At RA517, the relay R515, upon operating, opens a further point in the operating circuit for the relay R510 and prepares the operating circuit for the fifth counting relay R520. At RA516, the relay R515 opens the operating circuit for the relay R400 and prepares a new operating circuit for the last-mentioned relay. The relay R400 now restores to open, at RA402, a further point in the common portion of the operating circuits for the respective odd numbered counting relays and interrupts, at RA401, the operating circuit for the relay R420. Thereafter and when the fourth current pulse transmitted by way of the pulsing conductor C669 is terminated, the two relays R410 and R420 are caused to restore. From this point on, the manner in which the remaining counting and control relays of the register shown in Figs. 4 and 5 are successively energized in response to succeeding current pulses transmitted over the pulsing conductor C669 to the control network illustrated in Fig. 4 is in all respects similar to the operation of the first four counting relays as described above.

When the tenth counting relay R545 is energized in series with the ninth counting relay R540 at the beginning of the tenth current pulse transmitted over the pulsing conductor C669 to the register, it operates to open, at RA546 and its associated resting contact, the operating circuit for the control relay R400. The relay R400, upon restoring, interrupts the operating circuit for the relay R420 so that, at the end of the tenth pulse transmitted over the pulsing lead C669, the two relays R410 and R420 are caused to restore. Thus, at the end of the tenth current pulse, all four of the control relays R400, R410, R420 and R430 are deenergized. When the tenth counting relay R545 operates, it also completes, at RA546, a circuit for energizing the operating magnet 311 of the tenth marking element 310, this circuit extending by way of the grounded release conductor C588, the chain path comprising the operated armatures RA501, RA506, RA511, RA516, RA521, RA526, RA531, RA536, RA541 and RA546 of the ten operated counting relays, C179 and the winding of the magnet 311 to battery. As a result, the pen of the tenth marking element 310 is moved to the off-normal position to inscribe an off-trace line upon the record strip 303.

At RA548, the tenth counting relay R545, upon operating, completes a circuit including the grounded release conductor C588 for energizing the tenth control relay R569, which latter relay is of the slow-to-release type. The relay R569, upon operating, opens, at RA579, a point in the path over which ground potential is impressed upon the release conductor C588, thereby to interrupt the holding circuits over which all of the counting and control relays of the register are being held operated. Accordingly, all of the counting and control relays of the register are caused to restore. When the relay R569 operates to disconnect ground from the release conductor C588, the above-traced circuit for energizing the pen magnet 311 is interrupted, whereby the marking element 310 is returned to its normal position. Due to its slow-to-release characteristic, the tenth control relay R569 is the last of the indicated relays to restore and, upon restoring, recompletes, at RA579, the previously traced path over which ground potential is impressed upon the release conductor C588. Thus, the register is conditioned to start a new cycle of operation. The manner in which the register operates in response to each succeeding series of ten current pulses transmitted thereto is identical with that just described, it being pointed out that each time the tenth counting relay R545 operates, the operating magnet 311 of the tenth marking element 310 is momentarily energized to cause an off-trace line to be inscribed upon the record strip 303.

As indicated above, at the end of each cycle of operation of the test switch 10, a current pulse is transmitted to the control apparatus of the transfer switch shown in Figs. 6 and 7. Thus, at the end of the first half revolution of the wiper set embodied in the testing device 100 and when the wipers of this wiper set establish a bridge between the associated contact 115 and the twenty-sixth contact of the associated contact set 110, a circuit is completed for energizing the relay R730 of the transfer switch control network, this circuit extending from ground at the contact 115 of the testing device 100 by way of the wipers of this testing device and the twenty-sixth contact of the associated contact set 110, the pulsing conductor C659, RA721 and the winding of R730 to battery. Upon operating, the relay R730 completes, at RA731, a circuit extending by way of C679 and RA652 for energizing the first transfer relay R645 of the transfer switch. The relay R645, upon operating, completes, at RA647, a path for short-circuiting the winding of the second transfer relay R650, this path extending from ground at RA731 by way of C679, RA652, the winding of R650, RA647 and the release conductor C643 back to ground at RA582. At RA643, the relay R645 completes a circuit for energizing the control relay R700, this circuit extending by way of the grounded release conductor C643, RA643, RA653, C639 and the winding of R700 to battery. The relay R700, upon operating, applies, at RA702, multiple ground to the conductor C679, thereby to complete a multiple path short-circuiting the winding of R650 and a holding circuit for the first transfer relay R645. At RA701, the relay R700 prepares a circuit for energizing the relay R720. Thereafter, and when the wipers of the testing device 100 are moved to disconnect the contact 115 of this device from the twenty-sixth contact of the associated contact set 110, thereby to terminate the current pulse transmitted over the pulsing conductor C659 to the relay R730, the last-mentioned relay restores to complete the operating circuit for the relay R720, this circuit extending from ground at RA731 by way of RA701 and the winding of R720 to battery. The relay R720 now operates to open, at RA721 and its associated resting contact, a point in the above-traced operating circuit for the relay R730. At RA721 and its associated working contact, the relay R720 prepares a circuit for energizing the relay R710.

When the first transfer relay R645 operates, it also completes, at RA646, a circuit extending by way of the grounded release conductor C643 for energizing the first control relay R600. The relay R600, upon operating, disconnects, at RA601, the register pulsing conductor C669 from the contact segment 111 of the first testing device 100, and connects this pulsing conductor to the contact segment 111 of the second testing device 101. The conductor C669 is connected to the segment 111 of the testing device 101 over a path extending by way of RA601 and its associated working contact RA606, C603 and the springs 183 and 181 of the switch 131 to the contact segment 111 of the testing device 101. As a result of this transfer operation, current pulses are transmitted over the pulsing conductor C669 to the register shown in Figs. 4 and 5 only in response to operation of the second testing device 101 to test the lines having release conductors connected to the test conductors of the group 121. The manner in which the lines of this second group are tested is in all respects identical with the testing operations previously described. At the end of the second cycle of operation of the test switch 10, the first testing device 100 operates to again impress ground potential upon the pulsing conductor C659, thereby to transmit a second current pulse over this conductor to the control apparatus of the transfer switch as shown in Fig. 7. This second pulse is utilized to energize the relay R710, the operating circuit for this relay extending by way of the grounded pulsing conductor C659, RA721 and its associated working contact, and the winding of R710 to battery. Upon operating, the relay R710 completes, at RA712, a circuit including the grounded pulsing conductor C659 for maintaining the relay R720 energized until the second current pulse transmitted over C659 is ended. At RA711, the relay R710 opens a point in the previously traced path short-circuiting the winding of the second transfer relay R650. Following this operation, the respective windings of the two transfer relays R645 and R650 are energized in series over a circuit extending by way of the grounded release conductor C643, RA647, the winding of R650 and the winding of R645 to battery. The relay R645 remains operated and the second transfer relay R650 operates when this series circuit is established. Upon operating, the relay R650 opens, at RA652, a point in the operating circuit for the first transfer relay R645 and prepares a circuit for energizing the third transfer relay R655. At RA653 and its associated resting contact, the relay R650 interrupts the previously traced operating circuit for the relay R700 causing the last-mentioned relay to restore to open, at RA702, a further point in the previously traced path for short-circuiting the winding of the transfer relay R650.

At RA701, the relay R700 interrupts the above-traced operating circuit for the relay R720. Thereafter and when the second current pulse transmitted over the pulsing conductor C659 to the control apparatus of Fig. 7 is terminated, the two relays R710 and R720 restore. Thus, at the end of the second or first even numbered pulse, all of the relays shown in Fig. 7 are deenergized.

The second transfer relay R650, upon operating, also completes, at RA651, a circuit including the grounded release conductor C643 for energizing the second control relay R605 of the transfer switch. This control relay, upon operating, attracts its armature RA606 to disconnect the pulsing conductor C669, extending to the register, shown in Figs. 4 and 5, from the contact segment III of the second testing device 101 and to connect this pulsing conductor to the contact segment III of the third testing device 102. The path over which the pulsing conductor C669 is connected to the contact segment III of the third testing device 102 may be traced as extending by way of RA601 and its associated working contact, RA606 and its associated working contact, RA611 and its associated resting contact, C609, and the springs 183 and 181 of the switch 132 to the contact segment III of the testing device 102. Thus, the third testing device 102 is operatively associated with the register so that, during the third cycle of operation of the test switch 10, current pulses are transmitted to the register only in response to the operation of the third testing device to test busy lines in the associated group of lines. At the end of the third cycle of operation of the test switch 10, the testing device 100 again functions to impress ground potential upon the pulsing conductor C659, whereby the control relay R730 is again energized. Upon operating the second time, the relay R730 completes, at RA731, the circuit for energizing the third transfer relay R655, this circuit extending by way of C679, RA652, RA662 and the winding of R655 to battery. Upon operating, the relay R655 completes a path for short-circuiting the winding of the fourth transfer relay R660, this path extending by way of the grounded conductor C679, RA652, RA662, the winding of R660, and RA657 to the grounded release conductor C643. At RA658, the relay R655 completes a second circuit for energizing the relay R700, this second circuit extending by way of the grounded conductor C643, RA648, RA653, RA658, RA663, C689 and the winding of R700 to battery. The relay R700 now operates to reprepare the operating circuit for the relay R720 and to connect multiple ground to the conductor C679, thereby to complete a multiple holding circuit for the third transfer relay R655 and a multiple path short-circuiting the winding of the fourth transfer relay R660. At the end of the third current pulse transmitted from the testing device 100 to the control apparatus shown in Fig. 7, the relay R730 again restores to recomplete the previously traced operating circuit for the relay R720, causing the last-mentioned relay to operate and reprepare the operating circuit for the relay R710.

The third transfer relay R655, upon operating, also completes, at RA656, a circuit including the grounded release conductor C643 for energizing the third control relay R610 of the transfer switch. The last-mentioned relay, in turn, operates to disconnect, at RA611, the pulsing conductor C669 from the contact segment III of the third testing device 102 and to connect this pulsing conductor to the contact segment III of the fourth testing device 103. The path over which the pulsing conductor C669 is connected to the contact segment III of the fourth testing device 103 may be traced as extending by way of RA601, RA606, RA611, RA616, C603 and the switch springs 183 and 181 of the switch 133 to the contact segment III of the indicated testing device. Thus, the third control relay R610 operates to associate the register shown in Figs. 4 and 5 with the fourth testing device 103, so that the counting relays of the register are successively energized in response to succeeding current pulses transmitted from the indicated testing device over the pulsing conductor C669 during the fourth cycle of operation of the test switch 10. At the end of the fourth cycle of operation of the test switch 10, the testing device 100 again functions to impress ground potential upon the pulsing conductor C659 with the result that the relay R710 is again energized and operates to open, at RA711, the path short-circuiting the winding of the fourth transfer relay R660 and to complete, at RA712, the previously traced holding circuit for the relay R720. When the relay R710 operates the second time, the transfer relay R660 is energized in series with the third transfer relay R655 over a circuit extending by way of the grounded release conductor C643, RA657, the winding of R660 and the winding of R655 to battery. Upon operating, the relay R660, at RA662, opens a point in the operating circuit for the relay R655 and prepares a circuit for energizing the fifth transfer relay R665. At RA663, the relay R660 interrupts the previously traced alternative operating circuit for the control relay R700, causing the last-mentioned relay to restore to open, at RA701, a point in the operating circuit for the relay R720. Thereafter and at the end of the fourth current pulse transmitted by the testing device 100 over the pulsing conductor C659, the two relays R710 and R720 restore. Thus, at the end of the fourth current pulse transmitted to the transfer switch, all of the control relays shown in Fig. 7 are deenergized.

The fourth transfer relay R660, upon operating, also completes, at RA661, a circuit including the grounded release conductor C643 for energizing the fourth control relay R615. The relay R615 now operates to disconnect the pulsing conductor C669 from the contact segment III of the fourth testing device 103 and to connect this pulsing conductor to the contact segment III of the fifth testing device 104. The path over which the pulsing conductor C669 is connected to the contact segment III of the last-mentioned testing device may be traced as extending by way of RA601, RA606, RA611, RA616, RA621, C619 and the springs 183 and 181 of the switch 134 to the contact segment III of the testing device 104. The manner in which the remaining transfer and control relays of the transfer switch sequentially operate in response to succeeding current pulses transmitted by the testing device 100 to the control apparatus shown in Fig. 7 is substantially similar to that described above and will be readily understood. Each time one of the transfer relays operates, the associated control relay is energized and operates to associate the register with a succeeding one of the testing devices. When the ninth control relay R640 operates, it also functions to prepare a circuit, traced hereinafter, for energizing the operating magnet of one of the ten marking elements embodied in the recorder 20 and a circuit for energizing the relay R580. At the end of the tenth cycle of operation of the test switch 10 and when the wipers of the testing device 100 establish a bridge between the associated contact 115 and the twenty-sixth contact of the associated set 110, the tenth current pulse is delivered over the pulsing conductor C659 to the transfer switch control apparatus shown in Fig. 7. This apparatus functions in the manner previously explained to interrupt the path short-circuiting the winding of the tenth transfer relay R690 permitting this relay to be energized in series with the ninth transfer relay R685. Shortly thereafter, and when the wiper set 114 of the tenth testing device 109 establishes a bridge between its associated contact 116 and the twenty-seventh contact of the associated contact set 110, a circuit is completed for energizing the operating magnet of the marking element in the recorder 20 which corresponds to the last operated one of the control relays embodied in the register. For example, if the second control relay R561 of the register is the last operated one of the register control relays at the time the wiper set of the testing device 109 reaches the position indicated, the operating magnet 305 of the second marking element 302 is energized. The circuit for energizing this magnet may be traced as extending by way of the grounded conductor 693, the clip 694, the terminal 608', RA642, C644, the contact 116 of the testing device 109 and the twenty-seventh contact of the associated contact set 110 as bridged by the wipers of the associated wiper set 114, the terminal 193, the clip 595, the conductor 594, RA570, RA571, RA572, C171 and the winding of the magnet 305 to battery. When this circuit is completed, the marking element 302 is operated to inscribe an off-trace line upon the record strip 303. It will be noticed that the circuit for energizing the indicated magnet 305 includes an armature chain controlled by the control relays of the register. Hence, the particular marking element which is operated at the end of the tenth cycle of operation of the test switch 10 depends upon the number of operated relays in the register. For example, if five of the register control relays are operated at the end of the tenth cycle of operation of the test switch 10, the operating magnet of the fifth marking element is alone energized, the circuit for energizing this magnet being substantially similar to that traced above but extending by way of the armature chain RA570, RA571, RA572, RA573, RA574 and RA575 to the conductor C174, which conductor is connected to the operating magnet of the fifth marking element embodied in the recorder 20. Again, if seven of the register control relays are operated at the end of the tenth cycle of operation of the test switch 10, the operating magnet of the seventh marking element is energized.

When the wipers of the wiper set 114 embodied in the tenth testing device 109 are moved to disengage the associated contact 116 and the twenty-seventh contact of the associated contact set 110, a point is opened in the above-traced circuit for energizing the operating magnet of the marking element corresponding to the last operated one of the register control relays or, in the case assumed above, a point in the operating circuit for the magnet 305 of the second marking element 302. When this magnet is deenergized, the pen of the marking element 302 is returned to its normal position. Thereafter and when the wipers of the testing device 109 bridge the associated contact 117 and the twenty-eighth contact of the associated contact set 110, a circuit is completed for energizing the slow-to-release relay R580, this circuit extending from ground by way of the conductor 693, the clip 694, the terminal 608', RA642, C644, the contact 117 of the device 109 and the twenty-eighth contact of the associated contact set 110 as bridged by the wipers of the associated wiper set 114, the terminal 203, the clip 597, the conductor 596, and the winding of R580 to battery. The relay R580 now operates to disconnect ground from the two release conductors C588 and C643, thereby to deenergize all of the transfer and control relays embodied in the transfer switch and the operated ones of the counting and control relays embodied in the register. Thus, the transfer switch and the register are both conditioned to start new cycles of operation. In this regard, it is pointed out that, if an odd number of the counting relays in the register are operated at the time the slow-to-release relay R580 operates, such that the two relays R400 and R420 of the control network shown in Fig. 4 are operated, the two last-mentioned relays are sequentially deenergized since the operating circuit for the relay R400 includes the normally grounded release conductor C588.

The relay R580, upon operating, also completes a holding circuit for itself, this circuit extending from ground at RA581 by way of RA586 and the winding of R580 to battery. With the relay R580 operated, ground potential is impressed upon the respective inner conducting segments 113 of all of the testing devices 100 to 109, inclusive, over a path extending from ground at RA581 by way of the switch springs 591 and 592 and C161 to each of the conducting segments noted. When the wipers of the testing device 109 are moved to disengage the twenty-eighth contact of the associated contact set 110, the above-traced operating circuit for the relay R580 is interrupted. Thereafter and when the wipers of the respective testing devices are driven into engagement with their respective associated contact segments 113, the previously traced circuits are completed for energizing the respective operating magnets of all of the marking elements embodied in the recorder 20. As a result, all of the marking elements are operated to inscribe coincident off-trace lines upon the record strip 303, these lines indicating that the testing and recording cycle is fully completed. At this time, a circuit is also completed for energizing the slow-to-release relay R585, this circuit extending from ground at RA581 by way of the switch springs 591 and 592, C161, the contact segments 113 and associated wipers of the testing device 109, C179 and the winding of R585 to battery. Upon operating, the relay R585 opens, at RA586, a point in the above-traced holding circuit for the relay R580 and completes, at RA587, an alternative path for impressing ground potential upon the conductor C161, thereby to maintain itself operated and to maintain the operating magnets of the ten marking elements energized. When its holding circuit is interrupted in response to the operation of the relay R585, the relay R580 restores to open, at RA581, a further point in its holding circuit. At RA582, the relay R580 again connects ground to each of the two release conductors C588 and C643, thereby to condition the relays respectively embodied in the register and the transfer switch for new cycles of operation. Thereafter and when the wiper sets 114 of the respective testing devices 100 to 109, inclusive, are moved out of engagement with their respective associated conducting segments 113, the operating circuits for the operating magnets of the ten marking elements are all interrupted so that these marking elements are restored to normal. Also, when the wipers of the testing device 109 disengage the associated conducting segments 113, the holding circuit for the relay R585 is interrupted and this relay restores. At this point in the operation of the apparatus, a new testing cycle is initiated, the mode of operation of the apparatus during each succeeding cycle being exactly the same as just described.

The form of a typical record inscribed upon a segment of the record strip 303 during a complete test cycle of the character described above is illustrated in Fig. 10, wherein the coincident off-trace lines 1000 indicate the end of one testing cycle, the marks indicated at 1001 denote operations of the tenth marking element 310, the mark 1002 denotes a single operation of the second marking element 302, and the coincident off-trace lines indicated at 1000' denote the end of the test cycle. From a consideration of this record, it will be noted that seven operations of the tenth marking element 310 are recorded, and, further, that the second marking element 302 was operated at the end of the test cycle. Hence, this record indicates that seventy-two lines of the tested group were found to be busy during the complete test cycle, each operation of the tenth marking element denoting ten busy lines, and the single operation of the second marking element denoting the busy condition of two additional lines.

With the apparatus arranged in the manner described above, it may be conditioned simultaneously to test the lines of the ten subgroups in succession without in any way altering the connections between the release conductors of the lines and the test conductors of the test switch 10. To this end, it is only necessary to restore the ten key switches 130 to 139, inclusive, to their respective normal positions and to restore the switches 200 and 590 to normal. When these operations are performed, the register and transfer switch are effectively disassociated from the test switch 10 and the ten marking elements of the recorder 20 are connected to be directly controlled by corresponding ones of the testing devices 100 to 109, inclusive. Thus, at the springs of the switch 200, a point is opened in the common portion of the operating circuits for the relays R580 and R585 and the various relays embodied in the transfer switch and the register, thereby to preclude the operation of any of these relays. When the switch 130 is restored to normal, the contact segment 111 of the testing device 100 is disconnected, at the springs 181 and 183, from the conductor C604 extending to the transfer switch and is connected by way of the springs 181 and 182 and the conductor C170 directly to one terminal of the operating magnet 304 of the first marking element 301. Similarly, the contact segment 111 of the second testing device 100 is disconnected from the second conductor C603 extending to the transfer switch and is connected directly to the conductor C171 extending to the operating magnet 305 of the second marking element 302 when the key switch 131 is restored to normal. The contact segments 111 of the other testing devices are similarly directly included in the operating circuits for the operating magnets of the respective corresponding marking elements. After the indicated switches have been restored to normal, each marking element embodied in the recorder 20 is operated to inscribe an off-trace line on the record strip 303 each time the associated testing device operates to test a busy line in the associated subgroup, all in the manner previously explained. Also, the records of succeeding test cycles are separated through the simultaneous operation of the marking elements to inscribe coincident off-trace lines upon the record strip 303 in the manner previously explained.

As pointed out in the introductory portion of the specification, when the apparatus is arranged to test successively the lines of one large group, and to record at the end of the test the total number of lines found to be in a busy condition, a complete test cycle may be adjusted to accommodate any number of lines to be tested. For example, if the group of lines to be tested comprises only one hundred lines, the release conductors of these lines are respectively connected to the test conductors forming the conductor groups 120 to 123, inclusive, the remaining test conductors of the test switch 10 being left disconnected. In this case, the clip 595 terminating the conductor 594 is connected to the terminal 187; the clip 597 terminating the conductor 596 is connected to the terminal 197; and the clip 694 terminating the conductor 693 is connected to the terminal 602'. With the connections arranged in this manner, each complete test cycle is restricted to four cycles of operation of the test switch 10. Thus, at the end of the fourth cycle of operation of the test switch 10, and when the wipers of the testing device 103 establish a connection between the associated contact 116 and the twenty-seventh contact of the associated contact set 110, a circuit similar to that traced previously is completed for energizing the operating magnet of the marking element corresponding to the last operated counting relay embodied in the register. More specifically, this circuit may be traced as extending by way of the grounded conductor C693, the clip 694, the terminal 602', the operated armature RA612 of the third control relay R610, C613, the contact 116 of the testing device 103 and the twenty-seventh contact of the associated contact set 110 as bridged by the wipers of the associated wiper set 114, the terminal 187, the clip 595, the conductor 594, the armature chain of the control relays in the register and through the operating magnet of the marking element corresponding to the last operated register control relay to battery. Thereafter and when the wipers of the testing device 103 establish a conductive bridge between the associated contact 117 and the twenty-eighth contact of the associated contact set 110, a circuit similar to that traced previously is completed for energizing the relay R580, the circuit in the present case extending by way of the grounded cable 693, the clip 694, the terminal 602', RA612, C613, the contact 117 of the testing device 103 and the twenty-eighth contact of the associated contact set 110 as bridged by the wipers of the associated wiper set 114, the terminal 197, the clip 597, the cable 596 and the winding of R580 to battery. The resulting operation of the relay R580 causes all of the operated relays embodied in the register and transfer switch to be deenergized in the manner previously explained. With the relay R580 operated, the operating circuits for the operating magnets respectively embodied in the ten marking elements of the recorder 20 are all completed when the wipers of the testing devices 100 to 109, inclusive, bridge their respective associated conducting segments 113. The resulting operation of the marking elements causes the end of the cycle to be recorded. When the wipers of the tenth testing device 109 bridge their associated conducting segments 113, the previously traced operating circuit for the control relay R585 is also completed, causing this relay to operate to interrupt the holding circuit for the relay R580 and to complete its own holding circuit. Thereafter and when the second test cycle is started, the holding circuit for the relay R585 is interrupted at the conducting segments 113 of the testing device 109, causing this relay to restore. Thus, the apparatus is conditioned to repeat the test cycle. In a manner similar to that just described, any number of the testing devices 100 to 109, inclusive, may be arranged operatively to be associated with the register shown in Figs. 4 and 5 during each test cycle by connecting the clips 595, 597 and 694 to the appropriate terminals. Thus, the clip 595 may be connected to any one of the terminals 184 to 193, inclusive, the clip 597 may be connected to any one of the terminals numbered from 194 to 203, inclusive, it being understood that in any given case these two clips are connected to terminals associated with the same testing device. The clip 694 terminating the grounded conductor 693 may be connected to any one of the terminals numbered from 600′ to 608′, inclusive, it being pointed out that this clip is always connected to the one of the enumerated terminals which corresponds to the last testing device which is operatively to be associated with the register shown in Figs. 4 and 5.

Although the operation of the system has been described with reference to tests performed upon the lines of a telephone system, it will be understood that the apparatus is equally susceptible of use in testing many other types of apparatus. In this regard, it will be appreciated that relays, individually associated with the devices to be tested and arranged selectively to impress ground or no potential upon an associated one of the test conductors extending to the test switch 10, may be utilized to relay any desired condition to the test switch in order that a record of the condition may be made through operation of the recorder 20.

While there has been described what is at present considered to be the preferred embodiment of the invention, it will be understood that various modifications may be made therein, and it is intended to cover all such modifications in the appended claims as fall within the true spirit and scope of the invention.

What is claimed is:

1. In apparatus for testing a plurality of conductors which are divided into groups, each of said conductors being adapted to have a predetermined potential thereon, a register, a cyclically operating switch including a plurality of elements and means for operating said elements in unison, said elements individually corresponding to said groups of conductors and being operative concurrently to test the corresponding conductors of their respective corresponding groups, said elements also being operative to test all of the conductors of the respective corresponding groups during each operating cycle of said switch, and transfer means for operatively associating said register successively with different ones of said elements at the end of succeeding cycles of operation of said test switch, each of said testing devices, when operatively associated with said register, being operative to cause the operation of said register each time a conductor having said predetermined potential thereon is tested.

2. In apparatus for testing a plurality of conductors which are divided into groups, each of said conductors being adapted to have a predetermined potential thereon, a register, a cyclically operating switch including a plurality of elements and means for operating said elements in unison, said elements individually corresponding to said groups of conductors and being operative concurrently to test the corresponding conductors of their respective corresponding groups, said elements also being operative to test all of the conductors of the respective corresponding groups during each operating cycle of said switch, transfer means operative to associate said register successively with different ones of said elements, each of said elements, when operatively associated with said register, being operative to cause the operation of said register each time a conductor having said predetermined potential thereon is tested, and means controlled by one of said elements for causing the operation of said transfer means at the end of each cycle of operation of said test switch.

3. In apparatus for testing a plurality of conductors which are divided into groups, each of said conductors being adapted to have a predetermined potential thereon, a register, a cyclically operating switch including a plurality of elements and means for operating said elements in unison, said elements individually corresponding to said groups of conductors and being operative concurrently to test the corresponding conductors of their respective corresponding groups, said elements also being operative to test all of the conductors of the respective corresponding groups during each operating cycle of said switch, transfer means including a plurality of relays sequentially operative to associate said register successively with different ones of said elements in response to succeeding current pulses transmitted to said transfer means, each of said elements, when operatively associated with said register, being operative to cause the operation of said register each time a conductor having said predetermined potential thereon is tested, and means controlled by one of said elements for transmitting a current pulse to said transfer means at the end of each cycle of operation of said switch.

4. In apparatus for testing a plurality of conductors which are divided into groups, each of said conductors being adapted to have a predetermined potential thereon, a register, a switch including a plurality of wipers and means for operating said wipers in unison, said wipers individually corresponding to said groups of conductors and each being operative to test the conductors of the corresponding group, transfer means including a plurality of relays sequentially operative to associate said register successively with different ones of said wipers in response to succeeding current pulses transmitted to said transfer means, each of said wipers, when operatively associated with said register, being operative to cause the operation of said register each time a conductor having said predetermined potential thereon is tested, and means for transmitting a current pulse to said transfer means after each group of conductors is tested.

5. In apparatus for testing a plurality of conductors which are divided into groups, each of said conductors being adapted to have a predetermined potential thereon, a register, a cyclically operating switch including a plurality of elements and means for operating said elements in unison, said elements individually corresponding to said groups of conductors and being operative concurrently to test the corresponding conductors of their respective corresponding groups, said elements also being operative to test all of the conductors of the respective corresponding groups during each operating cycle of said switch, cyclically operating transfer means for operatively associating said register successively with different ones of said elements at the end of succeeding cycles of operation of said switch, each of said elements, when operatively associated with said register, being operative to cause the operation of said register each time a conductor having said predetermined potential thereon is tested, and means for changing the operating cycle of said transfer means so that any desired number of said elements are operatively associated with said register during each cycle of operation of said transfer means.

6. In apparatus for testing a plurality of conductors which are divided into groups, each of said conductors being adapted to have a predetermined potential thereon, a register, a cyclically operating switch including a plurality of elements and means for operating said elements in unison, said elements individually corresponding to said groups of conductors and being operative concurrently to test the corresponding conductors of their respective corresponding groups, said elements also being operative to test all of the conductors of the respective corresponding groups during each operating cycle of said switch, cyclically operating transfer means including a plurality of relays sequentially operative to associate said register successively with different ones of said testing devices in response to succeeding current pulses transmitted to said transfer means, each of said elements, when operatively associated with said register, being operative to cause the operation of said register each time a conductor having said predetermined potential thereon is tested, means controlled by one of said elements for transmitting a current pulse to said transfer means at the end of each cycle of operation of said switch, and means jointly controlled by one of said relays and one of said elements for initiating a new cycle of operation of said transfer means after a predetermined number of said elements have been operatively associated with said register.

7. In apparatus for testing a plurality of conductors which are divided into groups, each of said conductors being adapted to have a predetermined potential thereon, a register, a switch including a plurality of elements and means for operating said elements in unison, said elements individually corresponding to said groups of conductors and each being operative to test the conductors of the corresponding group, cyclically operating transfer means including a plurality of relays sequentially operative to associate said register successively with different ones of said elements in response to succeeding current pulses transmitted to said transfer means, each of said elements, when operatively associated with said register, being operative to cause the operation of said register each time a conductor having said predetermined potential thereon is tested, means for transmitting a current pulse to said transfer means after each group of conductors is tested, and means controlled by one of said relays for initiating a new cycle of operation of said transfer means after a predetermined number of said testing devices have been operatively associated with said register.

8. In apparatus for testing a plurality of conductors which are divided into groups, each of said conductors being adapted to have a predetermined potential thereon, a register, a switch including a plurality of elements and means for operating said elements, said elements individually corresponding to said groups of conductors and each being operative to test the conductors of the corresponding group, cyclically operating transfer means including a plurality of relays sequentially operative to associate said register successively with different ones of said testing devices in response to succeeding current pulses transmitted to said transfer means, each of said elements, when operatively associated with said register, being operative to cause the operation of said register each time a conductor having said predetermined potential thereon is tested, means for transmitting a current pulse to said transfer means after each group of conductors is tested, means controlled by one of said relays for initiating a new cycle of operation of said transfer means after a predetermined number of said elements have been operatively associated with said register, and means for selectively rendering said last-named means responsive to the operation of any one of said relays.

9. In apparatus for testing a plurality of devices subject to changing conditions, a register comprising a plurality of pulse counting relays sequentially operative in response to succeeding current pulses transmitted to said register, a recorder including a plurality of marking elements individually corresponding to said counting relays, means operative to test said devices in succession and to transmit a current pulse to said register each time a tested one of said devices is found to be in a predetermined condition, means responsive to the operation of a predetermined one of said relays for causing the operation of the corresponding marking element, and means for causing the operation of the marking element which corresponds to the last-operated counting relay of said register after all of said devices have been tested.

10. In apparatus for testing a plurality of conductors each adapted to have a predetermined potential thereon, a cyclically operating register comprising a plurality of pulse counting relays sequentially operative in response to succeeding current pulses transmitted to said register, a recorder including a plurality of marking elements individually corresponding to said counting relays, cyclically operating means operative successively to test all of said conductors during each operating cycle thereof and to transmit a current pulse to said register each time a conductor having said predetermined potential thereon is tested, means responsive to the operation of a predetermined one of said counting relays for causing the operation of the corresponding marking element at the end of each cycle of operation of said register, and means jointly controlled by said relays and said testing means for causing the operation of the marking element which corresponds to the last-operated counting relay of said register at the end of each operating cycle of said testing means.

11. In apparatus for testing a plurality of conductors each adapted to have a predetermined potential thereon, a cyclically operating register comprising a plurality of pulse counting relays sequentially operative in response to succeeding current pulses transmitted to said register, a recorder including a plurality of marking elements individually corresponding to said counting relays, cyclically operating means operative successively to test all of said conductors during each operating cycle thereof and to transmit a current pulse to said register each time a conductor having said predetermined potential thereon is tested, means responsive to the operation of a predetermined one of said counting relays for causing the operation of the corresponding marking element at the end of each cycle of operation of said register, means jointly controlled by said relays and said testing means for causing the operation of the marking element which corresponds to the last operated counting relay of said register at the end of each operating cycle of said testing means, and means controlled by said testing means for conditioning said relays to start a new cycle of operation at the end of each operating cycle of said testing means.

12. In apparatus for testing a plurality of conductors each adapted to have a predetermined potential thereon, a cyclically operating register comprising a plurality of pulse counting relays sequentially operative in response to succeeding current pulses transmitted to said register, a recorder including a plurality of marking elements individually corresponding to said counting relays, cyclically operating means operative successively to test all of said conductors during each operating cycle thereof and to transmit a current pulse to said register each time a conductor having said predetermined potential thereon is tested, means responsive to the operation of a predetermined one of said counting relays for causing the operation of the corresponding marking element at the end of each cycle of operation of said register and for deenergizing all of said relays thereby to condition said register for a new cycle of operation, means for causing the operation of the marking element which corresponds to the last-operated counting relay of said register at the end of each operating cycle of said testing means, and means controlled by said testing means for conditioning said relays to start a new cycle of operation at the end of each operating cycle of said testing means.

13. In apparatus for testing a plurality of conductors which are divided into groups, each of said conductors being adapted to have a predetermined potential thereon, a register comprising a plurality of pulse counting relays sequentially operative in response to succeeding current pulses transmitted to said register, a cyclically operating switch including a plurality of elements and means for operating said elements in unison, said elements individually corresponding to said groups of conductors and being operative concurrently to test the corresponding conductors of their respective corresponding groups, said elements also being operative to test all of the conductors in the respective corresponding groups during each operating cycle of said switch, transfer means including a plurality of relays sequentially operative to associate said register successively with different ones of said elements in response to succeeding current pulses transmitted to said transfer means, each of said elements, when operatively associated with said register, being operative to transmit a current pulse to said register each time a conductor having said predetermined potential thereon is tested, means controlled by one of said elements for transmitting a current pulse to said transfer means at the end of each cycle of operation of said switch, and means responsive to the operation of a predetermined one of said second-named relays for deenergizing all of said relays, thereby to condition said counting relays and said second-named relays for new cycles of operation.

14. In apparatus for testing a plurality of conductors which are divided into groups, each of said conductors being adapted to have a predetermined potential thereon, a register comprising a plurality of pulse counting relays sequentially operative in response to succeeding current pulses transmitted to said register, a recorder including a plurality of marking elements individually corresponding to said counting relays, a cyclically operating switch including a plurality of elements and means for operating said elements in unison, said elements individually corresponding to said groups of conductors and being operative concurrently to test the corresponding conductors of their respective corresponding groups, said elements also being operative to test all of the conductors in the respective corresponding groups during each operating cycle of said switch, transfer means including a plurality of relays sequentially operative to associate said register successively with different ones of said elements in response to succeeding current pulses transmitted to said transfer means, each of said elements, when operatively associated with said register, being operative to transmit a current pulse to said register each time a conductor having said predetermined potential thereon is tested, means controlled by said switch for transmitting a current pulse to said transfer means at the end of each cycle of operation of said switch, and means jointly controlled by one of said second-named relays, one of said elements and the last-operated one of said counting relays for causing the operation of the marking element corresponding to said last-operated counting relay after all of said conductors have been tested.

15. In apparatus for testing a plurality of conductors which are divided into groups, each of said conductors being adapted to have a predetermined potential thereon, a register comprising a plurality of pulse counting relays sequentially operative in response to succeeding current pulses transmitted to said register, a recorder including a plurality of marking elements individually corresponding to said counting relays, a cyclically operating switch including a plurality of elements and means for operating said elements in unison, said elements individually corresponding to said groups of conductors and being operative concurrently to test the corresponding conductors of their respective corresponding groups, said elements also being operative to test all of the conductors of the respective corresponding groups during each operating cycle of said switch, transfer means including a plurality of relays sequentially operative to associate said register successively with different ones of said elements in response to succeeding current pulses transmitted to said transfer means, each of said elements, when operatively associated with said register, being operative to transmit a current pulse to said register each time a conductor having said predetermined potential thereon is tested, means responsive to each operation of a predetermined one of said counting relays for causing the operation of the corresponding one of said marking elements and for conditioning said counting relays to start a new cycle of operation, means controlled by said switch for transmitting a current pulse to said transfer means at the end of each cycle of operation of said switch, means jointly controlled by one of said second-named relays, one of said elements and the last-operated one of said counting relays for causing the operation of the marking element corresponding to said last-operated counting relay after all of said conductors have been tested, and means jointly controlled by said one second-named relay and said one element for conditioning said counting relays to start a new cycle of operation and for conditioning said second-named relays to start a new cycle of operation.

ARTHUR T. SIGO.